US008078709B2

(12) United States Patent
Benbrahim et al.

(10) Patent No.: US 8,078,709 B2
(45) Date of Patent: Dec. 13, 2011

(54) METHODS AND DEVICES FOR GAMING NETWORK MANAGEMENT

(75) Inventors: Jamal Benbrahim, Reno, NV (US); Mark Bansemer, Reno, NV (US); Chris Reddicks, Reno, NV (US)

(73) Assignee: IGT, Reno, NV (US)

( * ) Notice: Subject to any disclaimer, the term of this patent is extended or adjusted under 35 U.S.C. 154(b) by 1206 days.

(21) Appl. No.: 11/215,181

(22) Filed: Aug. 29, 2005

(65) Prior Publication Data

US 2007/0049375 A1 Mar. 1, 2007

(51) Int. Cl.
*G06F 15/173* (2006.01)
*G06F 15/177* (2006.01)
*A63F 9/24* (2006.01)
*A63F 3/08* (2006.01)

(52) U.S. Cl. .......... 709/223; 709/220; 709/224; 463/42; 273/274

(58) Field of Classification Search .................. 709/220, 709/223, 224; 463/42
See application file for complete search history.

(56) References Cited

U.S. PATENT DOCUMENTS

| | | | | |
|---|---|---|---|---|
| 5,855,515 | A * | 1/1999 | Pease et al. | 463/27 |
| 6,183,367 | B1 * | 2/2001 | Kaji et al. | 463/42 |
| 6,280,325 | B1 * | 8/2001 | Fisk | 463/19 |
| 6,409,602 | B1 * | 6/2002 | Wiltshire et al. | 463/42 |
| 6,788,315 | B1 * | 9/2004 | Kekic et al. | 715/733 |
| 6,830,515 | B2 | 12/2004 | Rowe | |
| 2002/0144156 | A1 * | 10/2002 | Copeland, III | 713/201 |
| 2002/0147047 | A1 * | 10/2002 | Letovsky et al. | 463/42 |
| 2003/0233537 | A1 * | 12/2003 | Wohlgemuth et al. | 713/151 |
| 2004/0142744 | A1 * | 7/2004 | Atkinson et al. | 463/29 |
| 2004/0266532 | A1 | 12/2004 | Blackburn et al. | |
| 2006/0195567 | A1 * | 8/2006 | Mody et al. | 709/224 |

* cited by examiner

*Primary Examiner* — Ranodhi Serrao
(74) *Attorney, Agent, or Firm* — Weaver Austin Villneuve & Sampson LLP

(57) ABSTRACT

Methods and devices are provided for managing gaming machine networks. A switch may report the gaming machines that are currently connected to the switch. The report may be made periodically, in response to a query and/or in response to an event (such as the connection of a new gaming machine). The report may be made to a network administrator, e.g., to a host device under the control of a network administrator, and/or may be used to automatically update a connectivity table. A display of the current connectivity of gaming machines and associated switches may be provided. The prior connectivity of the gaming machines and associated switches may be displayed. The display may be a graphical user interface ("GUI") that allows a user to, e.g., resolve discrepancies between the current connectivity and the prior connectivity.

12 Claims, 9 Drawing Sheets

200

205

| Bank | Switch | Gaming Machine |
|---|---|---|
| 101 | 109 | 102 |
| 101 | 109 | 103 |
| 101 | 109 | 104 |
| 101 | 109 | 105 |
| 101 | 109 | 106 |
| 110 | 119 | 111 |
| 110 | 119 | 112 |
| 110 | 119 | 113 |
| 110 | 119 | 114 |
| 110 | 119 | 115 |
| 110 | 119 | 116 |
| 120 | 129 | 121 |
| 120 | 129 | 122 |
| 120 | 129 | 123 |
| 120 | 129 | 124 |
| 120 | 129 | 125 |
| 120 | 129 | 126 |
| 120 | 129 | 127 |
| 120 | 129 | 128 |

*Fig. 2A*

250

252 254

| Bank | Switch | Connected GM According to Network | Connected GM According to Database |
|---|---|---|---|
| 101 | 109 | 102 | 102 |
| 101 | 109 | 103 | 103 |
| 101 | 109 | 104 | 104 |
| 101 | 109 | 105 | 105 |
| 101 | 109 | 106 | 106 |
| | ***109*** | ***114*** | |
| 110 | 119 | 111 | 111 |
| 110 | 119 | 112 | 112 |
| 110 | 119 | 113 | 113 |
| 110 | ***119*** | | ***114*** |
| 110 | 119 | 115 | 115 |
| 110 | 119 | 116 | 116 |
| 120 | 129 | 121 | 121 |
| 120 | 129 | 122 | 122 |
| 120 | 129 | 123 | 123 |
| 120 | 129 | 124 | 124 |
| 120 | 129 | 125 | 125 |
| 120 | 129 | 126 | 126 |
| 120 | 129 | 127 | 127 |
| 120 | 129 | 128 | 128 |

255 260

*Fig. 2B*

METHODS AND DEVICES FOR GAMING NETWORK MANAGEMENT

FIELD OF THE INVENTION

The present invention relates to networks of gaming machines, such as slot machines and video poker machines. More particularly, the present invention relates to methods and devices for managing networked gaming machines.

BACKGROUND OF THE INVENTION

Typically, utilizing a master gaming controller, a gaming machine controls various combinations of devices that allow a player to play a game on the gaming machine and also encourage game play on the gaming machine. For example, a game played on a gaming machine usually requires a player to input money or an indicia of credit into the gaming machine, indicate a wager amount, and initiate game play. These steps require the gaming machine to control input devices, such as bill validators and coin acceptors, to accept money into the gaming machine and recognize user inputs from devices, including key pads, button pads, card readers, and ticket readers, to determine the wager amount, and initiate game play. After game play has been initiated, the gaming machine determines a game outcome, presents the game outcome to the player and may dispense an award of some type depending on the outcome of the game. The operations described above may be carried out on the gaming machine when the gaming machine is operating as a "stand alone" unit or linked in a network of some type to a group of gaming machines.

As technology in the gaming industry progresses, more and more gaming services are being provided to gaming machines via communication networks that link groups of gaming machines to a remote computer, such as a host server, that provides one or more gaming services. As an example, gaming services that may be provided by a remote computer to a gaming machine via a communication network of some type include player tracking, accounting, cashless award ticketing, lottery, progressive games, and progressive games or prizes. These services and features are provided in addition to the games that are available for play on the gaming machines.

Within a gaming establishment, networked gaming machines are typically organized into clusters or "banks." Normally, each bank will have an associated network device and each gaming machine will be in communication with the network device. For example, a wire or cable from each gaming machine may be physically connected to a port of the network device. Although various types of network devices may be used for this purpose, a switch is most commonly used. For the sakes of convenience and simplicity, a device so deployed will be referred to herein as a "switch."

As networks of gaming machines become larger and more complex, it can be challenging to manage these networks. One management issue arises, for example, when a gaming machine is moved from one bank to another. Currently, when a gaming machine is moved from one bank to another, a technician will make a record of moving the gaming machine, generally on paper. The record will be submitted to a gaming network administrator, who will manually change a database of switches and associated gaming machines according to the record(s) submitted. Although such a database can take many forms, it will sometimes be referred to herein as a "connectivity table."

There are a number of shortcomings in the foregoing method. For example, the technician who moves the gaming machine may neglect to make a record of the move. If the technician makes the record, he or she may forget to submit the record to the gaming network administrator or the record may be misplaced or misdirected. Even if the gaming network administrator receives the record, the administrator may fail to update the connectivity table or may make an erroneous update. For the foregoing reasons and other reasons, it would be desirable to provide novel methods and devices for managing gaming machine networks that address these and other limitations of the prior art.

SUMMARY OF THE INVENTION

The present invention provides novel method and devices for managing gaming machine networks. Some preferred implementations of the invention cause switches to report the gaming machines that are currently connected to the switch. The report may be made periodically, in response to a query and/or in response to an event (such as the connection of a new gaming machine). The report may be made to a network administrator, e.g., to a host device under the control of a network administrator, and/or may be used to automatically update a connectivity table.

Some implementations of the invention provide for a display of the current connectivity of gaming machines and associated switches in at least a portion of a gaming network, according to the report. Some such implementations also display the prior connectivity of the gaming machines and associated switches according to a previously stored connectivity table. Preferably, discrepancies between current and prior connectivity (such as those caused when a gaming machine has been moved to a new bank but a stored connectivity table has not been updated) are displayed in a conspicuous manner, some examples of which are described below. The display may be a graphical user interface ("GUI") that allows a user to, e.g., resolve discrepancies between the current connectivity and the prior connectivity and update stored connectivity table.

Some implementations of the invention provide a method of controlling a gaming network. The gaming network includes a network device assigned to each of a plurality of gaming machine clusters. Each gaming machine cluster includes a plurality of gaming machines. The method includes these steps: polling each network device for current connectivity data for each gaming machine currently connected to the network device; receiving current connectivity data from each polled network device, the current connectivity data comprising network device identification data and first gaming machine data for gaming machines connected to the network device; displaying the connectivity of network devices and connected gaming machines according to the current connectivity data and previously stored connectivity data; and allowing a user to update the previously stored connectivity data.

The first gaming machine data may be gaming machine address data. The gaming machine address data may include a Media Access Control address and/or an Internet Protocol address for each gaming machine. The method may also include these steps: referencing stored second gaming machine data; and determining second gaming machine data that correspond to the gaming machine address data.

The displaying and allowing steps may involve displaying a graphical user interface that allows a user to update the previously stored connectivity data. The method may include the step of polling each connected gaming machine for the first gaming machine data. The method may also include the step of receiving, by a network device, the first gaming machine data when a gaming machine is connected to the network device.

The displaying step may involve displaying a depiction of at least a portion of the gaming network, the depiction including network devices, gaming machines and connections between the network devices and gaming machines. On the other hand, the displaying step may involve displaying a table of network devices, gaming machines, current connectivity data and previously stored connectivity data.

The displaying step may also involve making a conspicuous display of at least one connection between a network device and a gaming machine when current connectivity data for the gaming machine do not correspond with previously stored connectivity data for the for the gaming machine. Alternatively, or additionally, the displaying step can involve making a conspicuous display of at least one table entry when current connectivity data for a gaming machine do not correspond with previously stored connectivity data for the for the gaming machine.

Alternative implementations of the invention provide another method of controlling a gaming network. The method includes the following steps: assigning a network device to each of a plurality of gaming machine clusters, each gaming machine cluster comprising a plurality of gaming machines, receiving, by a network device, first gaming machine data when a gaming machine is connected to the network device; receiving, by a central computing device, current connectivity data from each assigned network device, the current connectivity data comprising network device identification data and first gaming machine data for gaming machines connected to the network device; and updating previously stored connectivity data according to the current connectivity data.

The first gaming machine data may include gaming machine address data. The gaming machine address data may include a Media Access Control address and/or an Internet Protocol address for each gaming machine. The method may also involve referencing stored second gaming machine data and determining second gaming machine data that correspond to the gaming machine address data.

A table of network devices, gaming machines, current connectivity data and previously stored connectivity data may be displayed. In such implementations, the displaying step can involve making a conspicuous display of at least one table entry when current connectivity data for a gaming machine do not correspond with previously stored connectivity data for the gaming machine.

Alternatively, or additionally, a depiction of at least a portion of the gaming network may be displayed. The depiction may include network devices, gaming machines and connections between the network devices and gaming machines. In such implementations, the displaying step can involve making a conspicuous display of at least one connection between a network device and a gaming machine when current connectivity data for a gaming machine do not correspond with previously stored connectivity data for the for the gaming machine. The method may involve displaying a graphical user interface that allows a user to update the previously stored connectivity data.

The methods described herein may be implemented in hardware, firmware or software. For example, some aspects of the invention may be implemented by one or more devices in a network, e.g. as software for controlling one or more of the networked devices. These and other features of the present invention will be presented in more detail in the following detailed description of the invention and the associated figures.

BRIEF DESCRIPTION OF THE DRAWINGS

The invention may best be understood by reference to the following description taken in conjunction with the accompanying drawings, which are illustrative of specific implementations of the present invention.

FIG. 2A is table indicating network connectivity at the first time.

FIG. 2B is table indicating network connectivity at the second time and database entries indicating previous switch/gaming machine pairs.

DESCRIPTION OF THE PREFERRED EMBODIMENTS

Figure 1A:
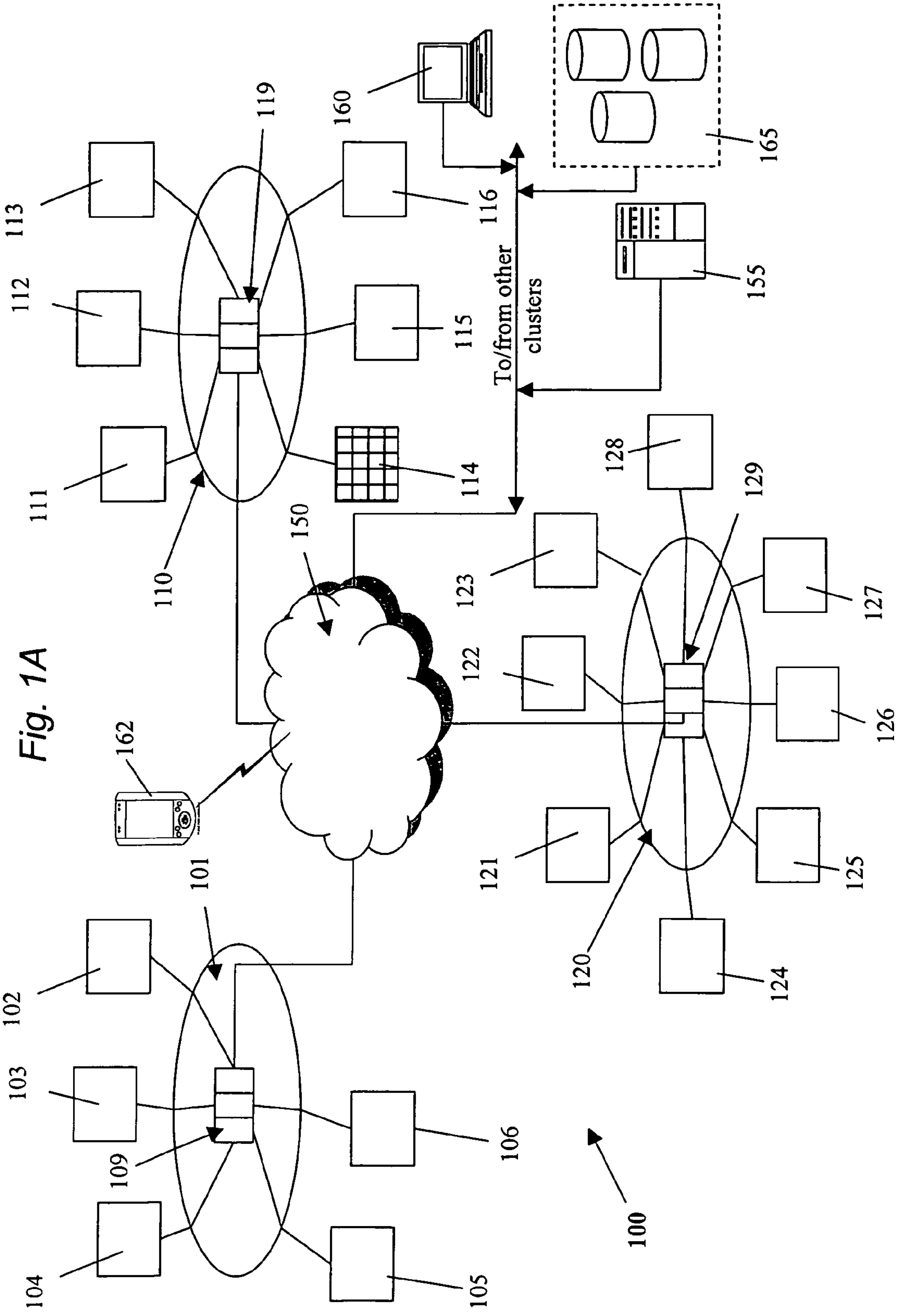
FIG. 1A is a block diagram depicting a portion of a network of gaming machines at a first time.

Reference will now be made in detail to some specific embodiments of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims. Moreover, numerous specific details are set forth below in order to provide a thorough understanding of the present invention. The present invention may be practiced without some or all of these specific details. In other instances, well known process operations have not been described in detail in order not to obscure the present invention.

The present invention provides novel method and devices for managing gaming machine networks, e.g., for the timely and accurate updating of gaming machine connectivity. Although the current description primarily describes networked gaming machines, some implementations of the invention apply equally to similar types of machines, such as video lottery terminals and other devices that are used primarily to display a game outcome.

As will be described in more detail below, some preferred implementations of the invention cause a switch assigned to each bank of gaming machines to report the gaming machines that are currently connected to the switch. For example, each switch in a gaming establishment may make such a report.

The report may be made periodically, in response to a query and/or in response to an event (such as the connection of a gaming machine that was not previously connected to the switch). The report may be made to a network administrator, e.g., to a host device under the control of a network administrator, and/or may be used to automatically update a connectivity table.

Preferred implementations of the invention provide for a display of the current connectivity of gaming machines and associated switches in at least a portion of a gaming network, e.g., according to the report. Some such implementations also display the prior connectivity of the gaming machines and associated switches according to a previously stored connectivity table. The display may take various forms, e.g., a table or a schematic display.

The gaming machine and/or its current or prior connectivity may be displayed in a conspicuous manner when a gaming machine's prior connectivity differs from its current connectivity. In order to facilitate a user's perception of such a discrepancy, an icon depicting a gaming machine may blink, may be displayed in a different color, brighter, with increased contrast, etc. Similarly, a symbol (e.g., a line) indicating the gaming machine's connection with one or more switches may blink, may be displayed in a different color (e.g., in red), brighter, with increased contrast, as a dashed or dotted line, etc. Alternatively, a portion of a tabular display may blink, may be displayed in larger font, italicized, bold, in a different font, etc.

In some implementations, the display is a GUI that allows a user to perceive and resolve discrepancies between the current connectivity and the prior connectivity and update stored connectivity table. For example, the current connectivity and/or the prior connectivity may be displayed in a conspicuous manner on a display of a device such as a laptop, a personal digital assistant ("PDA"), a desktop computer, etc. A user may use an input device such as a keypad, a mouse, a touch screen, etc., to select a portion of the display indicating the current connectivity and/or to delete a portion of the display indicating the prior connectivity.

FIG. 1A is a simplified schematic depiction of one portion of a gaming network of a gaming establishment. FIG. 1 A illustrates a portion of the gaming network at an initial time. Gaming network 100 includes banks, also referred to as "clusters," 101, 110 and 120, having assigned switches 109, 119 and 129, respectively. Bank 101 includes gaming machines 102 through 106 in communication with switch 109. Similarly, bank 110 includes gaming machines 111 through 116 in communication with switch 119 and bank 120 includes gaming machines 121 through 128 in communication with switch 129.

Switches 109, 119, 129 and other switches in the gaming establishment are interconnected via network 150. Gaming machines and other networked devices in other gaming establishments may also be interconnected via network 150. Some exemplary details of such a network are described below with reference to FIG. 4. Here, central server 155, host device 160 (which is a laptop computer in this example) and storage devices 165 are also connected to network 150. PDA 162 is configured for wireless connection with network 150. The gaming network includes other devices not depicted in FIG. 1A, some of which will be described below with reference to FIG. 4.

FIG. 2A illustrates one example of a connectivity table that may be used to record the connectivity shown at the initial time depicted in FIG. 1A. Each row of connectivity table 200 indicates a gaming machine, the switch with which the gaming machine is in communication and the bank to which the switch is assigned. For example, row 205 indicates that gaming machine 114 is connected to switch 119 of bank 110 at the initial time. In some implementations, devices referenced in connectivity table 200 are identified according to a Media Access Control ("MAC") address and/or an Internet Protocol ("IP") address. A data structure that represents connectivity table 200 may be stored, for example, in central server 155, in one of storage devices 165, in PDA 162 and/or in host device 1 60, any of which may be accessible to a network administrator. Other information may also be stored in connectivity table 200 or another such data structure, e.g., the switch port to which a gaming machine is connected, whether a gaming machine is a Class II or a Class III machine, whether a gaming machine is configured for server-based gaming, etc.

Figure 1B:
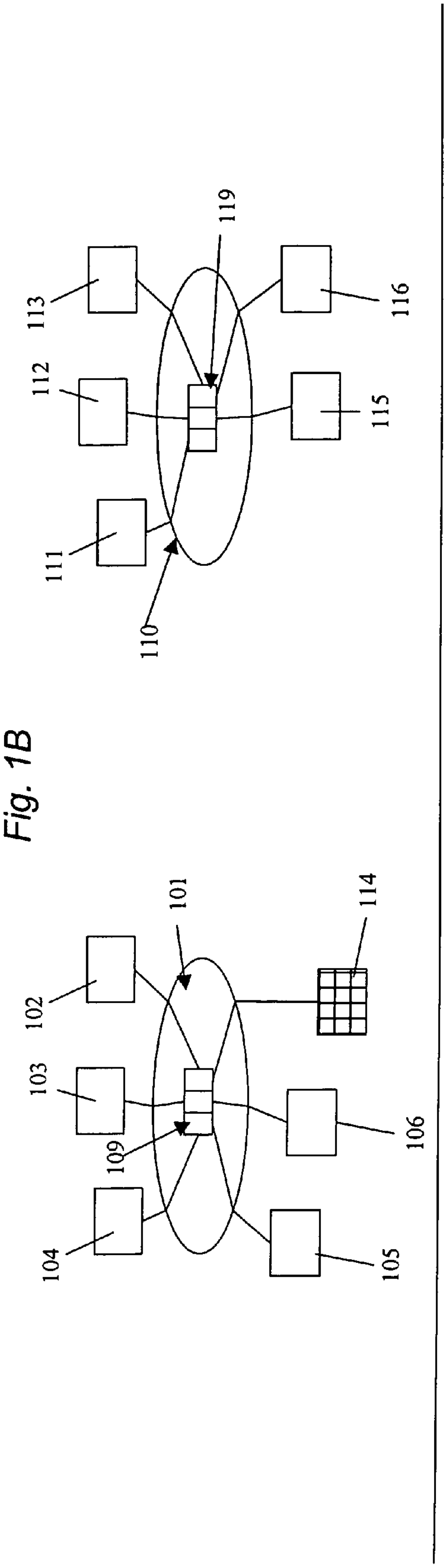
FIG. 1B is a block diagram depicting the portion of the network of gaming machines at a second time, after a gaming machine has been moved from one bank of gaming machines to another bank.

FIG. 1B is a schematic diagram indicating the gaming machines attached to banks 109 and 119 at a second and later time. As shown in FIG. 1B, gaming machine 114 has been moved and connected to switch 109. The present invention provides improved methods and devices for notifying a network administrator of such a change and/or of updating a connectivity table as a result of such a change. In some implementations, after the move has been detected and reported (e.g., as set forth in the examples below), the change is displayed in a conspicuous manner.

Figure 1C:
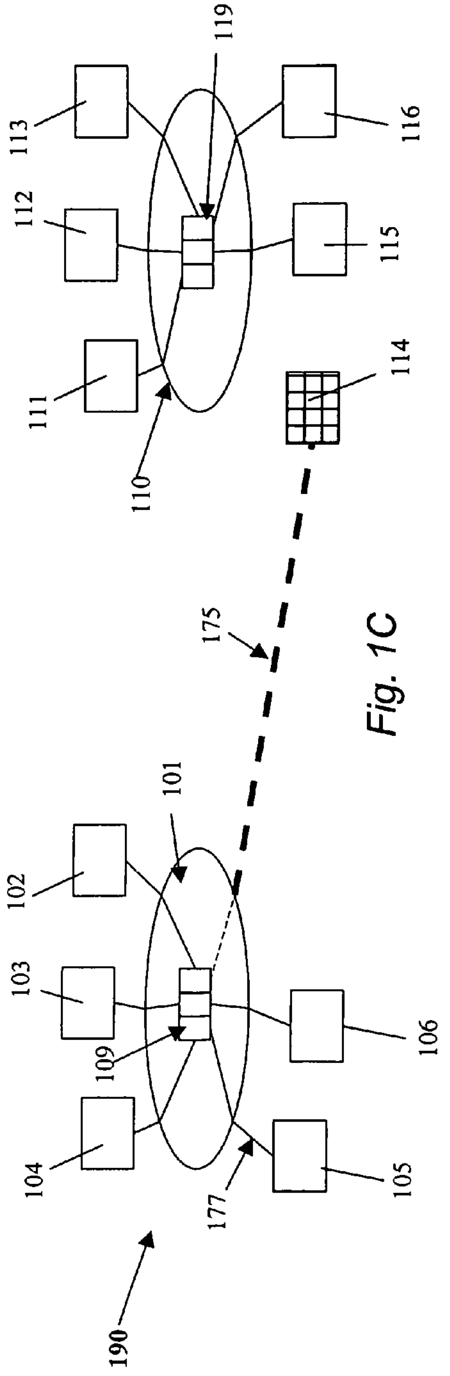
FIG. 1C is a block diagram depicting an example of a slot floor viewer's depiction of the portion of the network of gaming machines at the second time.

FIG. 1C provides one such example of such a display. Display 190 of FIG. C might be presented, for example, on a screen of a device such as host device 160, PDA 162, a desktop computer, etc. (See FIG. 1A.) Here, after gaming machine 114 has been moved, a report from switch 109 (or elsewhere in the network, e.g., server 155) indicates that gaming machine 114 is now connected to switch 109. However, a previously stored connectivity table (e.g., table 200) still indicates that gaming machine 114 is assigned to switch 119. In this example, the previously-stored location (referred to herein as the "database location" or the like, which is one component of what is referred to herein as "prior connectivity data" or the like) and the current connectivity of gaming machine 114 are indicated on display 190. The current connectivity of gaming machine 114 is illustrated on display 190 in a conspicuous manner (in this example, as a bold and dashed line 175). An operator may determine at a glance that gaming machine 114 has been moved to a new location, bank 101, and that the gaming machine/switch assignment data need to be updated.

The operator may also determine at a glance that the gaming machine/switch assignment data for the other gaming machines in banks 101 and 110 appear to be current, because the indicated connections are between these gaming machines and the nearest switch. For example, connection 177 should indicate the current connectivity of gaming machine 105, because connection 177 indicates that gaming machine 105 is connected with the nearest switch (switch 109).

FIG. 2B indicates another example of such a display. Display 250 allows a user to distinguish between the gaming machines currently configured for communication with a switch and those previously configured for communication with the switch. For example, row 255 indicates in bold and italics that gaming machine 114 is currently connected with switch 109, whereas row 260 indicates that gaming machine 114 was previously connected with switch 119.

Figure 3A:
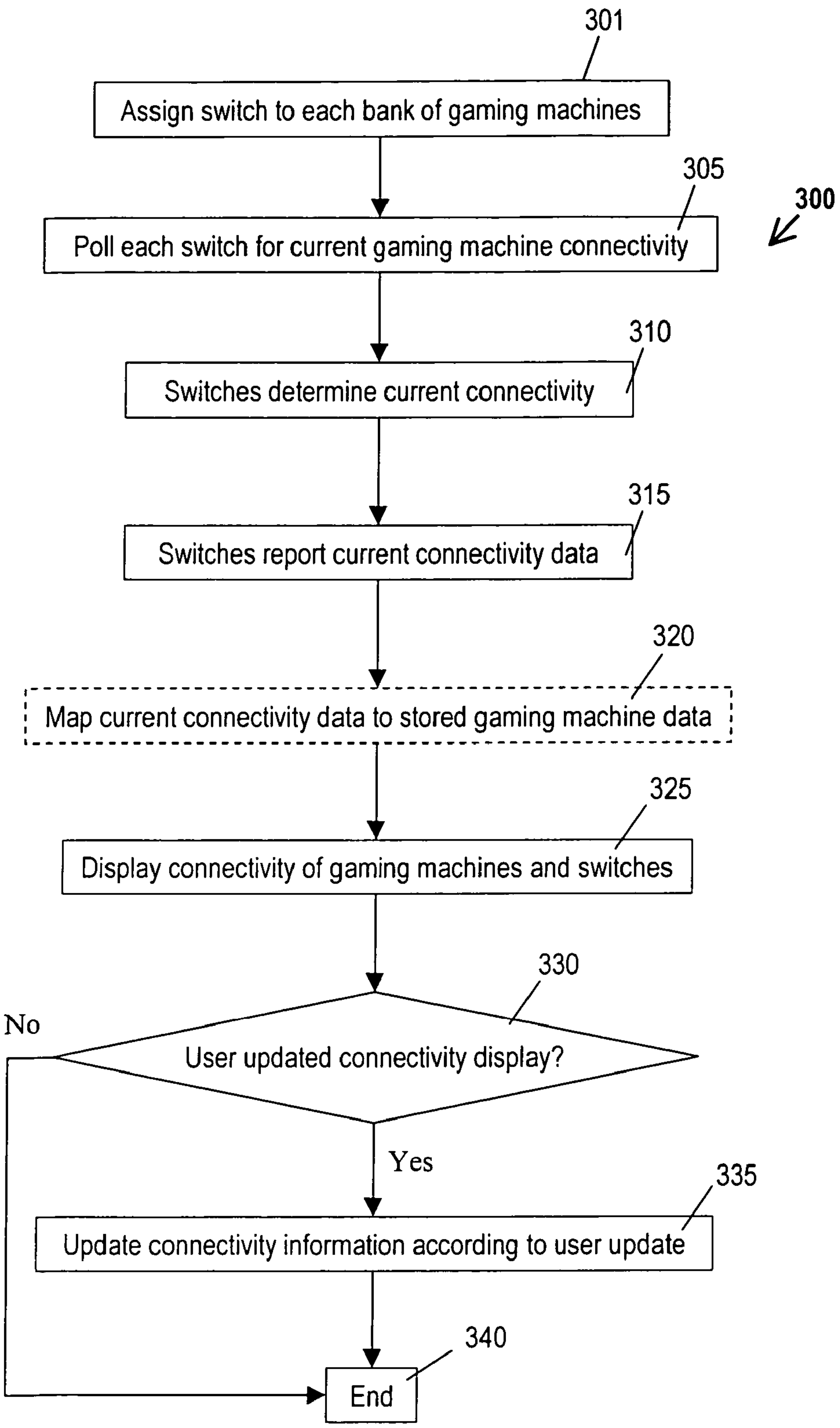
FIG. 3A is a flow chart that provides an overview of some methods of the present invention.
Figure 3B:
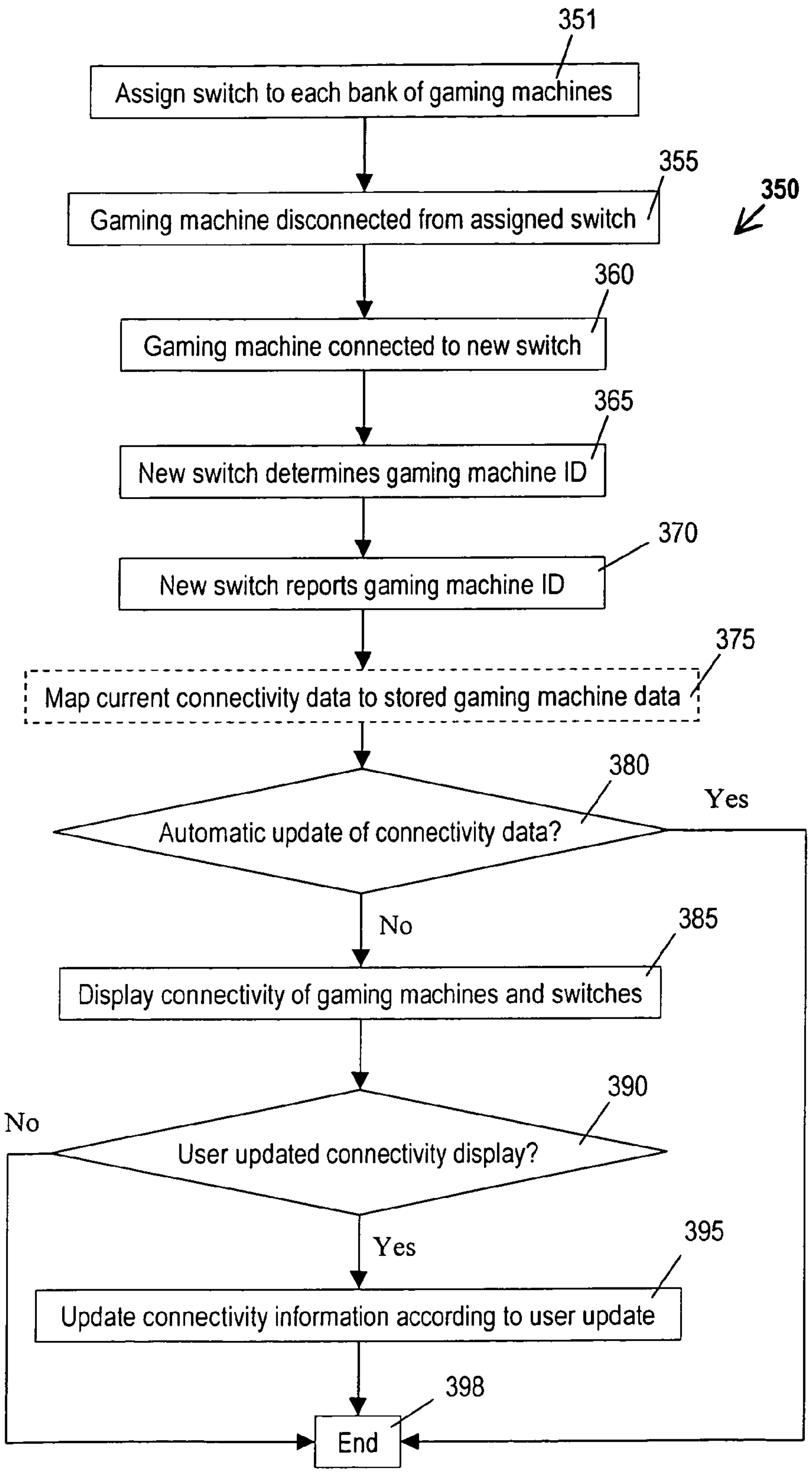
FIG. 3B is a flow chart that provides an overview of alternative methods of the present invention.

FIG. 3A outlines method 300 according to some implementations of the invention. Those of skill in the art will appreciate that the steps of methods 300 and 350 need not be performed (and in some implementations are not performed) in the order shown. Moreover, some implementations of methods 300 and 350 may include more or fewer steps than those shown in FIGS. 3A and 3B.

In step 301, at least one switch is assigned to each bank of gaming machines. Depending on the capacity of the switch and the number of gaming machines, some implementations may assign more than one switch to a bank of gaming machines. Method 300 is a "push-down" type of method, wherein each switch is periodically polled (e.g., by central server 155) to determine current gaming machine connectivity. (Step 305.) In step 310, the switches determine the current gaming machine connectivity, e.g., by polling each gaming machine, by looking up the currently connected gaming machines in a look-up table, a forwarding table or other data structure, etc.

Then, the switches report the current connectivity data to the requesting device. (Step 315.) The connectivity data will generally include a media access control ("MAC") address and/or an Internet Protocol ("IP") address of the gaming machine. In some implementations of the invention, the connectivity data will not include, for example, the serial number of the gaming machine or other pertinent data (e.g., what games the machine is configured to play, whether it is a Class II or a Class III machine, etc.) Therefore, in some implementations of the invention, the reported connectivity data will be mapped to other data in a central database to determine such information. (Step 320.) Alternatively, or additionally, such information may be obtained by polling the gaming machines attached to a switch for such information. For example, central server 155 may perform such polling functions. Such implementations do not require switches assigned to banks of gaming machines to have much intelligence and, accordingly, allow relatively inexpensive switches to be deployed for such purposes.

In step 325, the current connectivity data (and preferably the previously-stored connectivity data) of gaming machines and switches are displayed. As noted above, these data may be displayed, for example, in graphical or tabular form. In this example, the connectivity data are displayed on a screen of PDA 162, in a GUI having a format similar to that shown in FIG. 1C. Noting the conspicuously displayed current connectivity 175 of gaming machine 114, a user updates the connectivity display by indicating that gaming machine 114 is now configured for communication with switch 109. Here, the user updates the connectivity display by using an input device of PDA 162 (e.g., by touching the screen of PDA 162). For example, the user may "drag" an icon representing gaming machine 114 to a location near switch 109. The PDA may prompt the user to verify that gaming machine 114 has now been assigned to switch 109.

Because it is determined in step 330 that the user has updated the connectivity display, the stored connectivity data are updated according to the user. In this example, PDA 162 sends a signal to a central database via network 150 indicating how the connectivity data for gaming machine 114 should be changed.

Some implementations of the invention do not require user input in order to update stored connectivity data. One such implementation is method 350, illustrated by the flow chart of FIG. 3B. As before, at least one switch is assigned to each bank of gaming machines (step 351). However, in this example, gaming machines identify themselves to the switch and/or to another networked device (e.g., to central server 155) when they are connected and initialized. The gaming machine identification will generally include a media access control ("MAC") address and/or an Internet Protocol ("IP") address of the gaming machine. Therefore, a connectivity table can be populated when the gaming machines in each bank are connected to the corresponding switch: the gaming machines identify themselves to the switch and the switch transmits this information (and data identifying the switch) to a central device, such as server 155. In alternative embodiments, the gaming machines may be identified in other ways, e.g., by responding to a query from the switch or from another device connected to network 150, by being manually entered into a table, etc.

In step 355, a gaming machine is disconnected from its assigned switch and in step 360 the gaming machine is connected to another switch. After the gaming machine is connected to the new switch, the switch determines the identity of the gaming machine. (Step 365.) In this example, the switch determines the identity of the gaming machine when the gaming machine automatically identifies itself. In alternative embodiments, the switch determines the identity of the gaming machine when the gaming machine responds to a query from the switch. Preferably, a determination of the gaming machine's identity that is more involved that reporting, e.g., the MAC address of the gaming machine is performed by a device other than the attached switch. For example, a determination of whether the gaming machine is a Class II or a Class III machine would preferably be made by another device (e.g., host device 160 or central server 155).

The switch then reports the new connectivity information, including the gaming machine identification data and switch identification data, to a central device (e.g., a central server such as server 155). (Step 370.) As noted above, the transmitted connectivity data may not include, for example, the serial number of the gaming machine or other pertinent data. Therefore, in some implementations of the invention, the reported connectivity data will be mapped to other data in a central database to determine such information. (Step 375.) If such data were not previously stored, one or more devices (e.g., the gaming machine) may be queried (e.g., by server 155) to determine such information.

Some implementations of the invention provide for an automatic update of stored connectivity data upon receipt of the current connectivity data. For example, when central server 155 receives these data, central server 155 may automatically update a database of connectivity data stored, e.g., in one or more of storage devices 165. According to some implementations of the invention, if it is determined in step 380 that there has been an automatic update of stored connectivity data, the process ends. (Step 398.)

In this example, when it is determined in step 380 that there has not been an automatic update of stored connectivity data, the current and stored connectivity data are displayed as described above. (Step 385.) If a user updates the connectivity display (step 390), the stored connectivity data are revised according to the user's update. (Step 395.)

Alternative implementations of the invention display the connectivity of the gaming machines and switches even when there is an automatic update of stored connectivity data. The display may be used, for example, as a check to ensure that the automatic update has been conducted properly.

Figure 4:
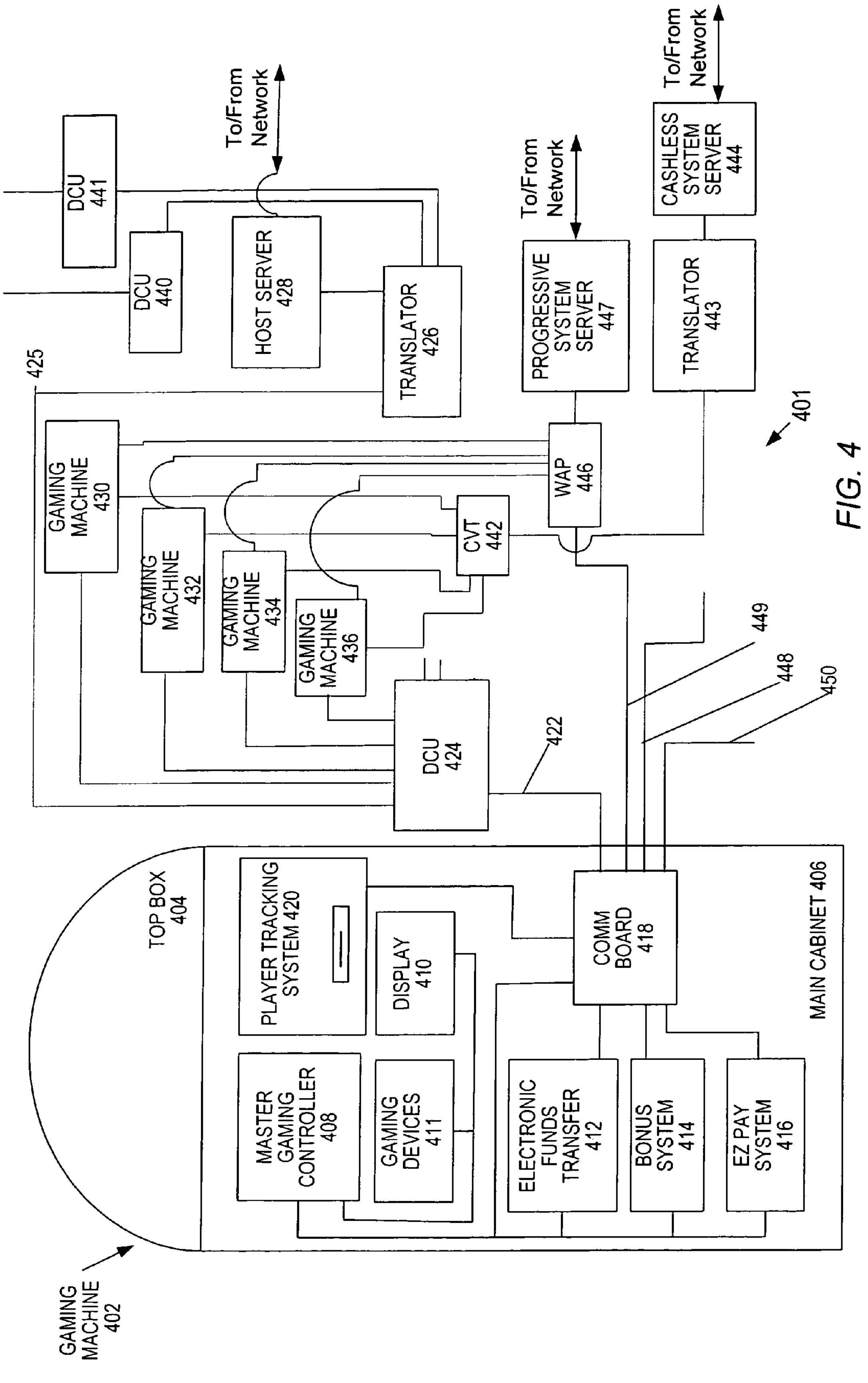
FIG. 4 is a block diagram that illustrates a gaming device and a portion of a gaming network that may be used to implement various embodiments of the present invention.

FIG. 4 is a simplified block diagram depicting, inter alia, gaming machines within gaming establishment 401. The gaming machines are connected with a dedicated communication network via a host server and a data collection unit ("DCU") according to one embodiment of the invention. According to some embodiments of the invention, the DCU is an enhanced DCU as described in U.S. patent application Ser. No. 10/187,059, entitled "Redundant Gaming Network Mediation," which is hereby incorporated by reference in its entirety.

In FIG. 4, gaming machine 402, and the other gaming machines 430, 432, 434, and 436, include a main cabinet 406 and a top box 404. The main cabinet 406 houses the main gaming elements and can also house peripheral systems, such as those that utilize dedicated gaming networks. The top box 404 may also be used to house these peripheral systems.

The master gaming controller 408 controls the game play on the gaming machine 402 and receives or sends data to various input/output devices 411 on the gaming machine 402. The master gaming controller 408 may also communicate with a display 410.

A particular gaming entity may desire to provide network gaming services that provide some operational advantage. Thus, dedicated networks may connect gaming machines to host servers that track the performance of gaming machines under the control of the entity, such as for accounting management, electronic fund transfers (EFTs), cashless ticketing, such as EZPay™, marketing management, and data tracking, such as player tracking. Therefore, master gaming controller 408 may also communicate with EFT system 412, bonus system 414, EZPay™ system 416 (a proprietary cashless ticketing system of the present assignee), and player tracking system 420. The systems of the gaming machine 402 communicate the data onto the network 422 via a communication board 418.

In some implementations, the dedicated communication network is not accessible to the public. Due to the sensitive nature of much of the information on the dedicated networks, for example, electronic fund transfers and player tracking data, usually the manufacturer of a host system, such as a player tracking system, or group of host systems, employs a particular networking language having proprietary protocols. For instance, 10-20 different companies produce player tracking host systems where each host system may use different protocols. These proprietary protocols are usually considered highly confidential and not released publicly. Thus, whenever a new host system is introduced for use with a gaming machine, rather than trying to interpret all the different protocols utilized by different manufacturers, the new host system is typically designed as a separate network. Consequently, as more host systems are introduced, the independent network structures continue to build up in the casino. Examples of protocol mediation to address these issues may be found, for example, in U.S. Pat. No. 6,682,423, "Open Architecture Communications in a Gaming Network," which is hereby incorporated by reference in its entirety.

Further, in the gaming industry, many different manufacturers make gaming machines. The communication protocols on the gaming machine are typically hard-coded into the gaming machine software, and each gaming machine manufacturer may utilize a different proprietary communication protocol. A gaming machine manufacturer may also produce host systems, in which case their gaming machines are compatible with their own host systems. However, in a heterogeneous gaming environment, such as a casino, gaming machines from many different manufacturers, each with their own communication protocol, may be connected to host systems from many different manufacturers, each with their own communication protocol. Therefore, communication compatibility issues regarding the protocols used by the gaming machines in the system and protocols used by the host systems must be considered.

In the present illustration, the gaming machines, 402, 430, 432, 434, and 436 are connected to a gaming network 422. In general, the DCU 424 functions as an intermediary between the different gaming machines on the network 422 and the host server 428. In general, the DCU 424 receives data transmitted from the gaming machines and sends the data to the host server 428 over a transmission path 426. In some instances, when the hardware interface used by the gaming machine is not compatible with the host server 428, a translator 425 may be used to convert serial data from the DCU 424 to a format accepted by the host server 428. The translator may provide this conversion service to a plurality of DCUs, such as 424, 440 and 441.

Further, in some dedicated gaming networks, the DCU 424 can receive data transmitted from the host server 428 for communication to the gaming machines on the gaming network. The received data may be communicated synchronously to the gaming machines on the gaming network. Within a gaming establishment, the gaming machines 402, 430, 432, 434 and 436 are located on the gaming floor for player access while the host server 428 is usually located in another part of gaming establishment 401 (e.g. the backroom), or at another location.

In a gaming network, gaming machines, such as 402, 430, 432, 434 and 436, may be connected through multiple communication paths to a number of gaming devices that provide gaming services. For example, gaming machine 402 is connected to four communication paths, 422, 448, 449 and 450. As described above, communication path 422 allows the gaming machine 402 to send information to host server 428.

Via communication path 448, the gaming machine 402 is connected to a clerk validation terminal 442. The clerk validation terminal 442 is connected to a translator 443 and a cashless system server 444 that are used to provide cashless gaming services to the gaming machine 402. In this implementation, other gaming machines in gaming establishment 401, including gaming machines 430, 432, 434 and 436, are also connected to clerk validation terminal 442 and also receive cashless system services. Moreover, in this implementation, cashless system server 444 is in communication with a network, which may include connectivity to gaming establishments other than gaming establishment 401. Accordingly, cashless system server 444 may provide cashless system services to gaming machines located in other gaming establishments.

Via communication path 449, the gaming machine 402 is connected to a wide area progressive (WAP) device 446. The WAP is connected to a progressive system server 447 that may be used to provide progressive gaming services to gaming machines in and, in this example, to gaming establishments other than gaming establishment 401. The progressive game services enabled by the progressive game network increase the game playing capabilities of a particular gaming machine by enabling a larger jackpot than would be possible if the gaming machine was operating in a "stand alone" mode. Playing a game on a participating gaming machine gives a player a chance to win the progressive jackpot. The potential size of the jackpot increases as the number of gaming machines connected in the progressive network is increased. The size of the jackpot tends to increase game play on gaming machines offering a progressive jackpot.

Gaming machines 430, 432, 434 and 436 are connected to WAP device 446 and progressive system server 447. Other gaming machines may also be connected to WAP device 446 and/or progressive system server 447, as will be described below with reference to FIG. 2. Via communication path 450, the gaming machine 402 may be connected with additional gaming devices (not shown) that provide other gaming services.

In some embodiments of the present invention, gaming machines and other devices in the gaming establishment depicted in FIG. 4 are connected to a central system and/or other gaming establishments via one or more networks, which may be public or private networks. In this example, host server 428, progressive system server 447 and cashless system server are connected to an outside network. In other embodiments, a bingo server, a switch, or another type of network device may be part of an interface with an outside network. In some embodiments, a single network device links a gaming establishment with another gaming establishment and/or a central system. Such a network device will sometimes be referred to herein as a "site controller."

Figure 5:
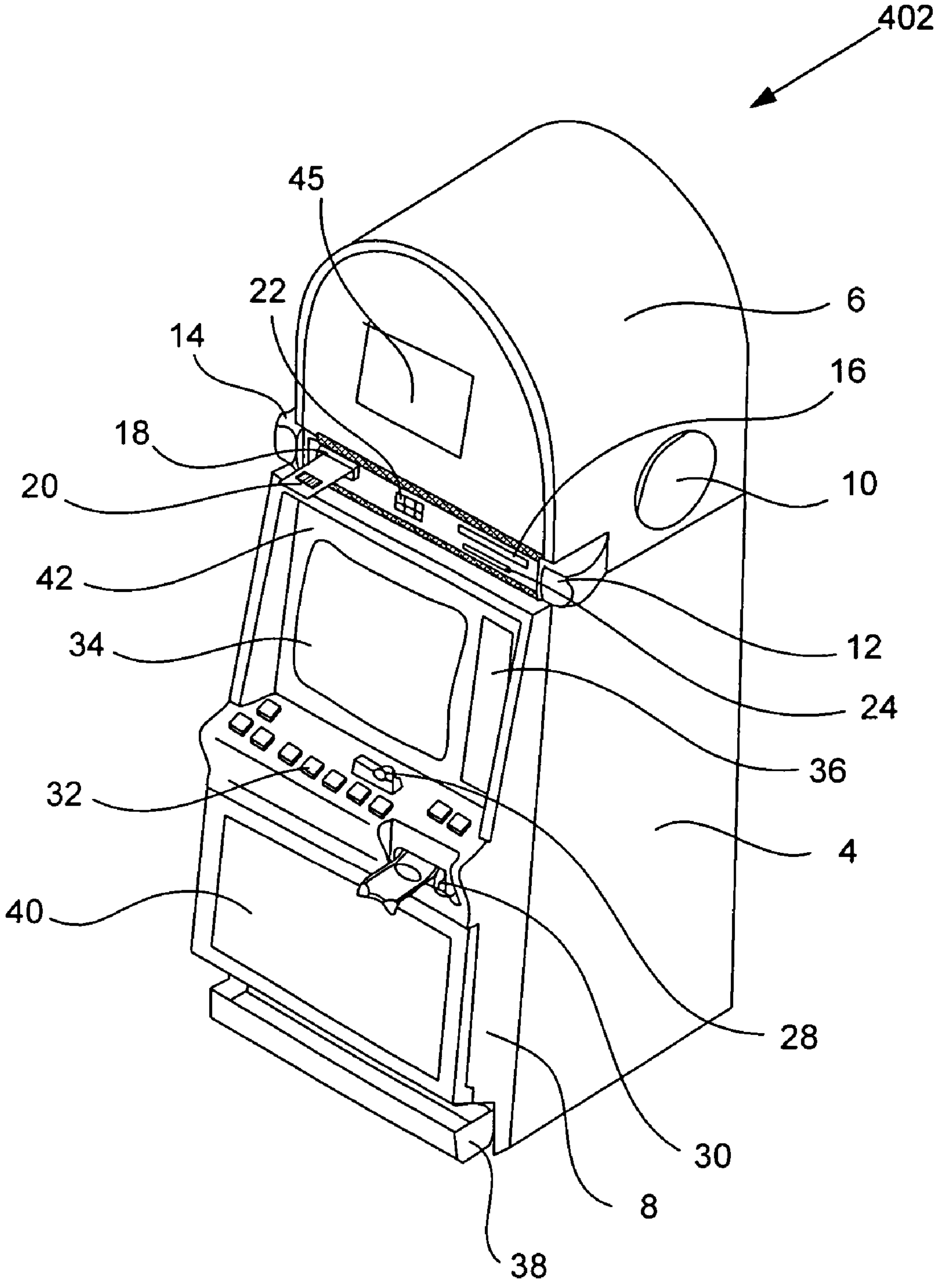
FIG. 5 illustrates a gaming device that may be used in accordance with various embodiments of the present invention.

Turning to FIG. 5, more details of gaming machine 402 are described. Machine 402 includes a main cabinet 4, which generally surrounds the machine interior (not shown) and is viewable by users. The main cabinet 4 includes a main door 8 on the front of the machine, which opens to provide access to the interior of the machine. Attached to the main door are player-input switches or buttons 32, a coin acceptor 28, and a bill validator 30, a coin tray 38, and a belly glass 40. Viewable through the main door is a video display monitor 34 and an information panel 36. The display monitor 34 will typically be a cathode ray tube, high resolution flat-panel LCD, or other conventional electronically controlled video monitor. The information panel 36 may be a back-lit, silk screened glass panel with lettering to indicate general game information including, for example, the number of coins played. The bill validator 30, player-input switches 32, video display monitor 34, and information panel are devices used to play a game on the gaming machine 402. The devices are controlled by circuitry housed inside the main cabinet 4 of the machine 402.

The gaming machine 402 includes a top box 6, which sits on top of the main cabinet 4. The top box 6 houses a number of devices, which may be used to add features to a game being played on the gaming machine 402, including speakers 10, 12, 14, a ticket printer 18 which may print bar-coded tickets 20 used as cashless instruments. The player tracking unit mounted within the top box 6 includes a key pad 22 for entering player tracking information, a florescent display 16 for displaying player tracking information, a card reader 24 for entering a magnetic striped card containing player tracking information, a microphone 43 for inputting voice data, a speaker 42 for projecting sounds and a light panel 44 to display various light patterns used to convey gaming information. In other embodiments, the player tracking unit and associated player tracking interface devices, such as 16, 22, 24, 42, 43 and 44, may be mounted within the main cabinet 4 of the gaming machine, on top of the gaming machine, or on the side of the main cabinet of the gaming machine.

Understand that gaming machine 402 is but one example from a wide range of gaming machine designs on which the present invention may be implemented. For example, not all suitable gaming machines have top boxes or player tracking features. Further, some gaming machines have two or more game displays—mechanical and/or video—and, some gaming machines are designed for bar tables and have displays that face upwards. Still further, some machines may be designed entirely for cashless systems. Such machines may not include such features as bill validators, coin acceptors and coin trays. Instead, they may have only ticket readers, card readers and ticket dispensers. Those of skill in the art will understand that the present can be deployed on most gaming machines now available or hereafter developed.

Some preferred gaming machines of the present assignee are implemented with special features and/or additional circuitry that differentiates them from general-purpose computers (e.g., desktop PC's and laptops). Gaming machines are highly regulated to ensure fairness and, in many cases, gaming machines are operable to dispense monetary awards of multiple millions of dollars. Therefore, to satisfy security and regulatory requirements in a gaming environment, hardware and software architectures may be implemented in gaming machines that differ significantly from those of general-purpose computers. A description of gaming machines relative to general-purpose computing machines and some examples of the additional (or different) components and features found in gaming machines are described below.

At first glance, one might think that adapting PC technologies to the gaming industry would be a simple proposition because both PCs and gaming machines employ microprocessors that control a variety of devices. However, because of such reasons as 1) the regulatory requirements that are placed upon gaming machines, 2) the harsh environment in which gaming machines operate, 3) security requirements and 4) fault tolerance requirements, adapting PC technologies to a gaming machine can be quite difficult. Further, techniques and methods for solving a problem in the PC industry, such as device compatibility and connectivity issues, might not be adequate in the gaming environment. For instance, a fault or a weakness tolerated in a PC, such as security holes in software or frequent crashes, may not be tolerated in a gaming machine because in a gaming machine these faults can lead to a direct loss of funds from the gaming machine, such as stolen cash or loss of revenue when the gaming machine is not operating properly.

For the purposes of illustration, a few differences between PC systems and gaming systems will be described. A first difference between gaming machines and common PC based computers systems is that gaming machines are designed to be state-based systems. In a state-based system, the system stores and maintains its current state in a non-volatile memory, such that, in the event of a power failure or other malfunction the gaming machine will return to its current state when the power is restored. For instance, if a player was shown an award for a game of chance and, before the award could be provided to the player the power failed, the gaming machine, upon the restoration of power, would return to the state where the award is indicated. As anyone who has used a PC, knows, PCs are not state machines and a majority of data is usually lost when a malfunction occurs. This requirement affects the software and hardware design on a gaming machine.

A second important difference between gaming machines and common PC based computer systems is that for regulation purposes, the software on the gaming machine used to generate the game of chance and operate the gaming machine has been designed to be static and monolithic to prevent cheating by the operator of gaming machine. For instance, one solution that has been employed in the gaming industry to prevent cheating and satisfy regulatory requirements has been to manufacture a gaming machine that can use a proprietary processor running instructions to generate the game of chance from an EPROM or other form of non-volatile memory. The coding instructions on the EPROM are static (non-changeable) and must be approved by a gaming regulators in a particular jurisdiction and installed in the presence of a person representing the gaming jurisdiction. Any changes to any part of the software required to generate the game of chance, such as adding a new device driver used by the master gaming controller to operate a device during generation of the game of chance can require a new EPROM to be burnt, approved by the gaming jurisdiction and reinstalled on the gaming machine in the presence of a gaming regulator. Regardless of whether the EPROM solution is used, to gain approval in most gaming jurisdictions, a gaming machine must demonstrate sufficient safeguards that prevent an operator or player of a gaming machine from manipulating hardware and software in a manner that gives them an unfair and some cases an illegal advantage. The gaming machine should have a means to determine if the code it will execute is valid. If the code is not valid, the gaming machine must have a means to prevent the code from being executed. The code validation requirements in the gaming industry affect both hardware and software designs on gaming machines.

A third important difference between gaming machines and common PC based computer systems is the number and kinds of peripheral devices used on a gaming machine are not as great as on PC based computer systems. Traditionally, in the gaming industry, gaming machines have been relatively simple in the sense that the number of peripheral devices and the number of functions the gaming machine has been limited. Further, in operation, the functionality of gaming machines were relatively constant once the gaming machine was deployed, i.e., new peripherals devices and new gaming software were infrequently added to the gaming machine. This differs from a PC where users will go out and buy different combinations of devices and software from different manufacturers and connect them to a PC to suit their needs depending on a desired application. Therefore, the types of devices connected to a PC may vary greatly from user to user depending in their individual requirements and may vary significantly over time.

Although the variety of devices available for a PC may be greater than on a gaming machine, gaming machines still have unique device requirements that differ from a PC, such as device security requirements not usually addressed by PCs. For instance, monetary devices, such as coin dispensers, bill validators and ticket printers and computing devices that are used to govern the input and output of cash to a gaming machine have security requirements that are not typically addressed in PCs. Therefore, many PC techniques and methods developed to facilitate device connectivity and device compatibility do not address the emphasis placed on security in the gaming industry.

To address some of the issues described above, a number of hardware/software components and architectures are utilized in gaming machines that are not typically found in general purpose computing devices, such as PCs. These hardware/software components and architectures, as described below in more detail, include but are not limited to watchdog timers, voltage monitoring systems, state-based software architecture and supporting hardware, specialized communication interfaces, security monitoring and trusted memory.

A watchdog timer is normally used in IGT gaming machines to provide a software failure detection mechanism. In a normally operating system, the operating software periodically accesses control registers in the watchdog timer subsystem to “re-trigger” the watchdog. Should the operating software fail to access the control registers within a preset timeframe, the watchdog timer will timeout and generate a system reset. Typical watchdog timer circuits contain a loadable timeout counter register to allow the operating software to set the timeout interval within a certain range of time. A differentiating feature of the some preferred circuits is that the operating software cannot completely disable the function of the watchdog timer. In other words, the watchdog timer always functions from the time power is applied to the board.

IGT gaming computer platforms preferably use several power supply voltages to operate portions of the computer circuitry. These can be generated in a central power supply or locally on the computer board. If any of these voltages falls out of the tolerance limits of the circuitry they power, unpredictable operation of the computer may result. Though most modern general-purpose computers include voltage monitoring circuitry, these types of circuits only report voltage status to the operating software. Out of tolerance voltages can cause software malfunction, creating a potential uncontrolled condition in the gaming computer. Gaming machines of the present assignee typically have power supplies with tighter voltage margins than that required by the operating circuitry. In addition, the voltage monitoring circuitry implemented in IGT gaming computers typically has two thresholds of control. The first threshold generates a software event that can be detected by the operating software and an error condition generated. This threshold is triggered when a power supply voltage falls out of the tolerance range of the power supply, but is still within the operating range of the circuitry. The second threshold is set when a power supply voltage falls out of the operating tolerance of the circuitry. In this case, the circuitry generates a reset, halting operation of the computer.

The standard method of operation for IGT slot machine game software is to use a state machine. Each function of the game (bet, play, result, etc.) is defined as a state. When a game moves from one state to another, critical data regarding the game software is stored in a custom non-volatile memory subsystem. In addition, game history information regarding previous games played, amounts wagered, and so forth also should be stored in a non-volatile memory device. This feature allows the game to recover operation to the current state of play in the event of a malfunction, loss of power, etc. This is critical to ensure the player’s wager and credits are preserved. Typically, battery backed RAM devices are used to preserve this critical data. These memory devices are not used in typical general-purpose computers.

IGT gaming computers normally contain additional interfaces, including serial interfaces, to connect to specific subsystems internal and external to the slot machine. The serial devices may have electrical interface requirements that differ from the “standard” EIA RS232 serial interfaces provided by general-purpose computers. These interfaces may include EIA RS485, EIA RS422, Fiber Optic Serial, optically coupled serial interfaces, current loop style serial interfaces, etc. In addition, to conserve serial interfaces internally in the slot machine, serial devices may be connected in a shared, daisy-chain fashion where multiple peripheral devices are connected to a single serial channel.

IGT gaming machines may alternatively be treated as peripheral devices to a casino communication controller and connected in a shared daisy chain fashion to a single serial interface. In both cases, the peripheral devices are preferably assigned device addresses. If so, the serial controller circuitry must implement a method to generate or detect unique device addresses. General-purpose computer serial ports are not able to do this.

Security monitoring circuits detect intrusion into an IGT gaming machine by monitoring security switches attached to access doors in the slot machine cabinet. Preferably, access violations result in suspension of game play and can trigger additional security operations to preserve the current state of game play. These circuits also function when power is off by use of a battery backup. In power-off operation, these circuits continue to monitor the access doors of the slot machine. When power is restored, the gaming machine can determine whether any security violations occurred while power was off, e.g., via software for reading status registers. This can trigger event log entries and further data authentication operations by the slot machine software.

Trusted memory devices are preferably included in an IGT gaming machine computer to ensure the authenticity of the software that may be stored on less secure memory subsystems, such as mass storage devices. Trusted memory devices and controlling circuitry are typically designed to not allow modification of the code and data stored in the memory device while the memory device is installed in the slot machine. The code and data stored in these devices may include authentication algorithms, random number generators, authentication keys, operating system kernels, etc. The purpose of these trusted memory devices is to provide gaming regulatory authorities a root trusted authority within the computing environment of the slot machine that can be tracked and verified as original. This may be accomplished via removal of the trusted memory device from the slot machine computer and verification of the secure memory device contents is a separate third party verification device. Once the trusted memory device is verified as authentic, and based on the approval of the verification algorithms contained in the trusted device, the gaming machine is allowed to verify the authenticity of additional code and data that may be located in the gaming computer assembly, such as code and data stored on hard disk drives.

Mass storage devices used in a general purpose computer typically allow code and data to be read from and written to the mass storage device. In a gaming machine environment, modification of the gaming code stored on a mass storage device is strictly controlled and would only be allowed under specific maintenance type events with electronic and physical enablers required. Though this level of security could be provided by software, IGT gaming computers that include mass storage devices preferably include hardware level mass storage data protection circuitry that operates at the circuit level to monitor attempts to modify data on the mass storage device and will generate both software and hardware error triggers should a data modification be attempted without the proper electronic and physical enablers being present.

Returning to the example of FIG. 5, when a user wishes to play the gaming machine 402, he or she inserts cash through the coin acceptor 28 or bill validator 30. In addition, the player may use a cashless instrument of some type to register credits on the gaming machine 402. For example, the bill validator 30 may accept a printed ticket voucher, including 20, as an indicium of credit. As another example, the card reader 24 may accept a debit card or a smart card containing cash or credit information that may be used to register credits on the gaming machine.

During the course of a game, a player may be required to make a number of decisions, which affect the outcome of the game. For example, a player may vary his or her wager on a particular game, select a prize for a particular game, or make game decisions regarding gaming criteria that affect the outcome of a particular game. The player may make these choices using the player-input switches 32, the video display screen 34 or using some other device which enables a player to input information into the gaming machine.

During certain game functions and events, the gaming machine 402 may display visual and auditory effects that can be perceived by the player. These effects add to the excitement of a game, which makes a player more likely to continue playing. Auditory effects include various sounds that are projected by the speakers 10, 12, 14. Visual effects include flashing lights, strobing lights or other patterns displayed from lights on the gaming machine 402, from lights behind the belly glass 40 or the light panel on the player tracking unit 44.

After the player has completed a game, the player may receive award credits, game tokens from the coin tray 38 or the ticket 20 from the printer 18, which may be used for further games or to redeem a prize. Further, the player may receive a ticket 20 for food, merchandise, or games from the printer 18. The type of ticket 20 may be related to past game playing recorded by the player tracking software within the gaming machine 402. In some embodiments, these tickets may be used by a game player to obtain game services.

Figure 6:
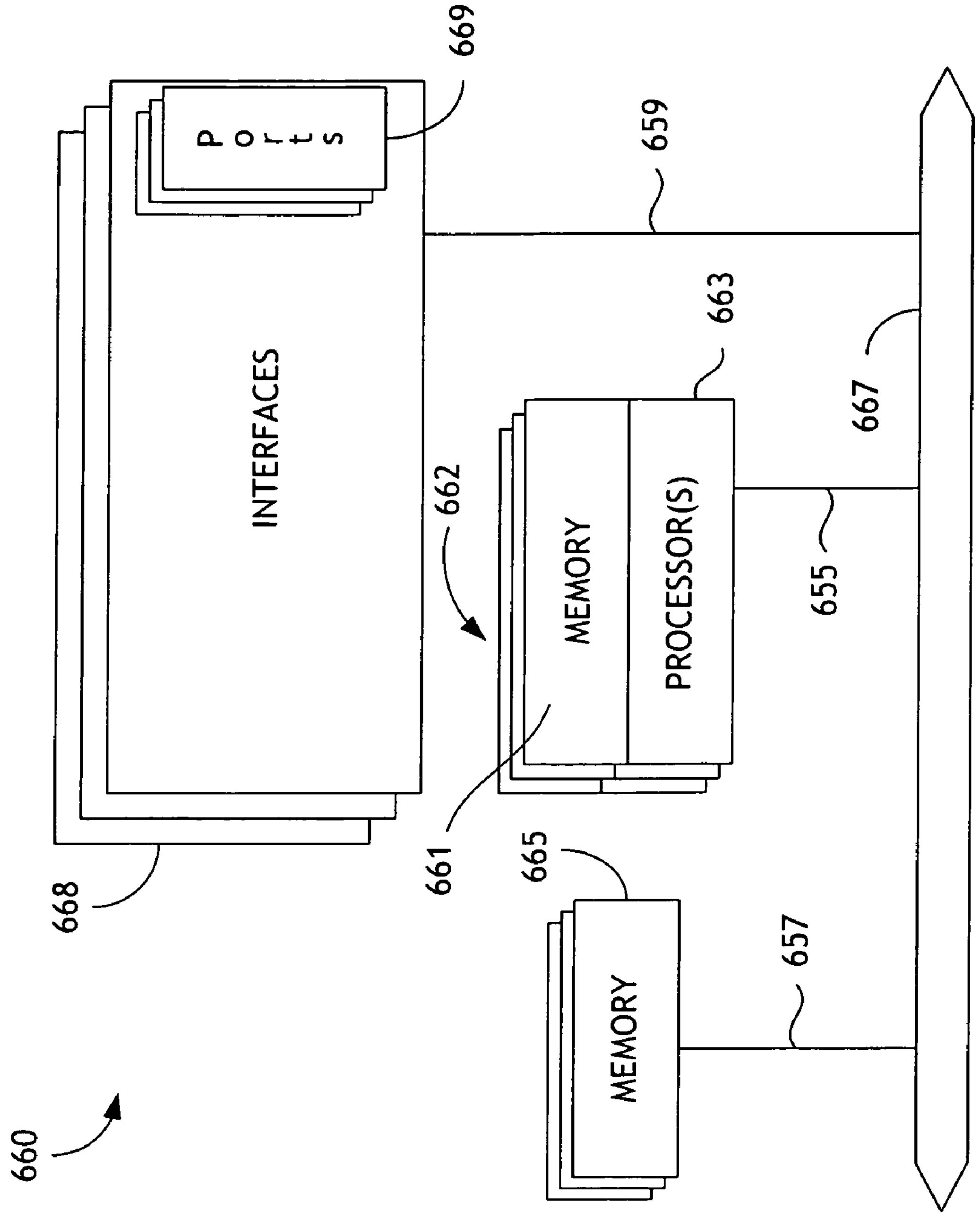
FIG. 6 is a block diagram of a network device that may be used to implement various embodiments of the present invention.

FIG. 6 illustrates an example of a network device that may be configured to implement some methods of the present invention. Network device 660 includes a master central processing unit (CPU) 662, interfaces 668, and a bus 667 (e.g., a PCI bus). Generally, interfaces 668 include ports 669 appropriate for communication with the appropriate media. In some embodiments, one or more of interfaces 668 includes at least one independent processor and, in some instances, volatile RAM. The independent processors may be, for example ASICs or any other appropriate processors. According to some such embodiments, these independent processors perform at least some of the functions of the logic described herein. In some embodiments, one or more of interfaces 668 control such communications-intensive tasks as media control and management. By providing separate processors for the communications-intensive tasks, interfaces 668 allow the master microprocessor 662 efficiently to perform other functions such as routing computations, network diagnostics, security functions, etc.

The interfaces 668 are typically provided as interface cards (sometimes referred to as "linecards"). Generally, interfaces 668 control the sending and receiving of data packets over the network and sometimes support other peripherals used with the network device 660. Among the interfaces that may be provided are FC interfaces, Ethernet interfaces, frame relay interfaces, cable interfaces, DSL interfaces, token ring interfaces, and the like. In addition, various very high-speed interfaces may be provided, such as fast Ethernet interfaces, Gigabit Ethernet interfaces, ATM interfaces, HSSI interfaces, POS interfaces, FDDI interfaces, ASI interfaces, DHEI interfaces and the like.

When acting under the control of appropriate software or firmware, in some implementations of the invention CPU 662 may be responsible for implementing specific functions associated with the functions of a desired network device. According to some embodiments, CPU 662 accomplishes all these functions under the control of software including an operating system and any appropriate applications software.

CPU 662 may include one or more processors 663 such as a processor from the Motorola family of microprocessors or the MIPS family of microprocessors. In an alternative embodiment, processor 663 is a specially designed hardware for controlling the operations of network device 660. In a specific embodiment, a memory 661 (such as non-volatile RAM and/or ROM) also forms part of CPU 662. However, there are many different ways in which memory could be coupled to the system. Memory block 661 may be used for a variety of purposes such as, for example, caching and/or storing data, programming instructions, etc.

Regardless of network device's configuration, it may employ one or more memories or memory modules (such as, for example, memory block 665) configured to store data, program instructions for the general-purpose network operations and/or other information relating to the functionality of the techniques described herein. The program instructions may control the operation of an operating system and/or one or more applications, for example.

Because such information and program instructions may be employed to implement the systems/methods described herein, the present invention relates to machine-readable media that include program instructions, state information, etc., for performing various operations described herein. Examples of machine-readable media include, but are not limited to, magnetic media such as hard disks, floppy disks, and magnetic tape; optical media such as CD-ROM disks; magneto-optical media; and hardware devices that are specially configured to store and perform program instructions, such as read-only memory devices (ROM) and random access memory (RAM). The invention may also be embodied in a carrier wave traveling over an appropriate medium such as airwaves, optical lines, electric lines, etc. Examples of program instructions include both machine code, such as produced by a compiler, and files containing higher level code that may be executed by the computer using an interpreter.

Although the system shown in FIG. 6 illustrates one specific network device of the present invention, it is by no means the only network device architecture on which the present invention can be implemented. For example, an architecture having a single processor that handles communications as well as routing computations, etc., is often used. Further, other types of interfaces and media could also be used with the network device. The communication path between interfaces may be bus based (as shown in FIG. 6) or switch fabric based (such as a cross-bar).

The above-described devices and materials will be familiar to those of skill in the computer hardware and software arts. Although many of the components and processes are described above in the singular for convenience, it will be appreciated by one of skill in the art that multiple components and repeated processes can also be used to practice the techniques of the present invention. Conversely, the steps in some processes and/or components in some embodiments may be combined within the scope of the present invention. For example, some steps described herein as being performed by a progressive server could be performed, e.g., by a site controller or by one or more other networked devices.

While the invention has been particularly shown and described with reference to specific embodiments thereof, it will be understood by those skilled in the art that changes in the form and details of the disclosed embodiments may be made without departing from the spirit or scope of the invention. For instance, while the gaming machines of this invention have been depicted as having a top box mounted on top of the main gaming machine cabinet, the use of gaming devices in accordance with this invention is not so limited. For example, a gaming machine may be provided without a top box, or may have additional boxes or devices attached, or may be configured in bar tops, table tops, or other structures. Further, the location of the signature input devices on the gaming machine may vary widely in different embodiments. Additionally, the gaming network may be connected to other devices including other servers or gaming devices over the Internet or through other wired and wireless systems. Moreover, embodiments of the present invention may be employed with a variety of network protocols and architectures.

Thus, the examples described herein are not intended to be limiting of the present invention. It is therefore intended that the appended claims will be interpreted to include all variations, equivalents, changes and modifications that fall within the true spirit and scope of the present invention.

We claim:

1. A computer-implemented method of controlling a gaming network, the method comprising:

polling, via one or more processors, a plurality of network devices of a casino, each network device assigned to a cluster of wager gaming machines, for current connectivity data, the current connectivity data comprising network device identification data and first gaming machine identification data for wager gaming machines directly connected to the network device via the gaming network at a current time, wherein the first gaming machine identification data comprise gaming machine address data;

receiving the current connectivity data from each polled network device;

retrieving previously-stored connectivity data, the previously-stored connectivity data comprising network device identification data and first gaming machine identification data for wager gaming machines directly connected to the network device via the gaming network at a time prior to the current time;

determining changes in connectivity of the network devices and the wager gaming machines by comparing the current connectivity data with the previously-stored connectivity data;

displaying, via a display device, the determined changes in connectivity of the network devices and the wager gaming machines, including data representing the current connectivity data and data representing the previously-stored connectivity data; and allowing, via an input device, a user to update the previously-stored connectivity data with the current connectivity data.

2. The method of claim 1, wherein the displaying and allowing steps comprise displaying a graphical user interface that allows the user to update the previously-stored connectivity data.

3. The method of claim 1, further comprising the step of polling each connected wager gaming machine for the first gaming machine identification data.

4. The method of claim 1, further comprising the step of receiving, by one of the plurality of network devices, the first gaming machine identification data when a wager gaming machine is connected to the network device.

5. The method of claim 1, wherein the displaying step comprises displaying a depiction of at least a portion of the gaming network, the depiction including network devices, wager gaming machines and connections between the network devices and wager gaming machines.

6. The method of claim 5, wherein the displaying step further comprises displaying at least one connection between a network device and a wager gaming machine when the connection is associated with a determined change in connectivity data for the wager gaming machine in a manner different from the manner in which connections between a network device and a wager gaming machine that are not associated with a determined change are displayed.

7. The method of claim 1, wherein the displaying step comprises displaying a table of network devices, wager gaming machines, current connectivity data and previously-stored connectivity data.

8. The method of claim 7, wherein the displaying step further comprises highlighting at least one table entry when current connectivity data for a wager gaming machine associated with the at least one table entry do not correspond with the previously-stored connectivity data for the wager gaming machine.

9. The method of claim 1, wherein the gaming machine address data comprise at least one of a Media Access Control address or an Internet Protocol address for each wager gaming machine.

10. The method of claim 1, further comprising:

referencing stored second gaming machine data; and determining second gaming machine data that correspond to the gaming machine address data.

11. An apparatus for controlling a gaming network, the apparatus comprising:

means for polling a plurality of network devices of a casino, each network device assigned to a cluster of wager gaming machines, for current connectivity data indicating each wager gaming machine currently communicatively and directly connected to the network device via the gaming network;

means for receiving current connectivity data from each polled network device, the current connectivity data comprising network device identification data and first gaming machine identification data for wager gaming machines communicatively and directly connected to the network device via the gaming network at a current time, wherein the first gaming machine identification data comprise gaming machine address data;

means for retrieving previously-stored connectivity data, the previously-stored connectivity data comprising network device identification data and first gaming machine identification data for wager gaming machines communicatively connected to the network device at a time prior to the current time;

means for displaying changes in the connectivity of network devices and connected wager gaming machines, the changes in the connectivity of network devices and connected wager gaming machines determined by comparing the current connectivity data with the previously-stored connectivity data; and means for allowing a user to update the previously-stored connectivity data.

12. A device, comprising:

a network interface;

a display device;

a user input device; and at least one processor configured to do the following:

poll, via the network interface, a plurality of network devices of a casino, each network device assigned to a cluster of wager gaming machines, for current connectivity data, receive, via the network interface, the current connectivity data from each polled network device, the current connectivity data comprising network device identification data and first gaming machine identification data for wager gaming machines communicatively and directly connected to the network device via a gaming network at a current time, wherein the first gaming machine identification data comprise gaming machine address data, retrieve previously-stored connectivity data, the previously-stored connectivity data comprising network device identification data and first gaming machine identification data for wager gaming machines communicatively and directly connected to the network device via the gaming network at a time prior to the current time, determine changes in connectivity of the network devices and the wager gaming machines by comparing the current connectivity data with the previously-stored connectivity data, display, via the display device, the determined changes in connectivity of the network devices and the wager gaming machines, receive input, via the user input device, indicating a change to the previously-stored connectivity data, and update the previously-stored connectivity data according to the input.

* * * * *